(12) United States Patent
Epstein et al.

(10) Patent No.: US 11,984,990 B2
(45) Date of Patent: May 14, 2024

(54) DEVICES AND METHODS FOR SUPPORTING HARQ FOR Wi-Fi

(71) Applicant: HUAWEI TECHNOLOGIES CO., LTD., Guangdong (CN)

(72) Inventors: Leonid Epstein, Munich (DE); Shimon Shilo, Munich (DE); Yaron Ben-Arie, Hod Hasharon (IL); Ezer Melzer, Hod Hasharon (IL); Doron Ezri, Hod Hasharon (IL); Wei Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 17/099,251

(22) Filed: Nov. 16, 2020

(65) Prior Publication Data

US 2021/0075559 A1     Mar. 11, 2021

Related U.S. Application Data

(63) Continuation of application No. PCT/EP2018/081333, filed on Nov. 15, 2018.

(51) Int. Cl.
    *H04L 1/18*       (2023.01)
    *H04L 1/00*       (2006.01)
    (Continued)

(52) U.S. Cl.
    CPC .......... *H04L 1/1819* (2013.01); *H04L 1/0008* (2013.01); *H04L 1/0011* (2013.01); *H04L 1/0061* (2013.01); *H04L 1/1621* (2013.01)

(58) Field of Classification Search
None
See application file for complete search history.

(56) References Cited

U.S. PATENT DOCUMENTS 11,134,493 B2 *   9/2021   Zhang ................... H04L 1/1845
2012/0140743 A1    6/2012   Pelletier et al.
(Continued)

FOREIGN PATENT DOCUMENTS

CN       101286825 A     10/2008
CN       102714580 A     10/2012
(Continued)

OTHER PUBLICATIONS

Liu et al., "VHT Frame Padding," IEEE 802.11-10/0064r4, Mar. 16, 2010, 13 pages.
(Continued)

*Primary Examiner* — Kouroush Mohebbi
(74) *Attorney, Agent, or Firm* — Fish & Richardson P.C.

(57) ABSTRACT

The present disclosure relates to Hybrid Automatic Repeat Request (HARQ) in wireless communication technologies, particularly HARQ for IEEE 802.11, i.e. HARQ for Wi-Fi. One example transmitting device is configured to encapsulate a data unit in a container unit, and encode the container unit into a codeword set of one or more codewords. One example receiving device is configured to receive, from a transmitting device, at least one codeword set of one or more codewords, decode the codewords of the codeword set to obtain a container unit, and decapsulate the container unit to obtain a data unit. A bit-size of the container unit is equal to a bit-size of the codeword set in the transmitting device and the receiving device.

21 Claims, 7 Drawing Sheets

(51) Int. Cl.
*H04L 1/1607* (2023.01)
*H04L 1/1812* (2023.01)

(56) References Cited

U.S. PATENT DOCUMENTS

| | | | | |
|---|---|---|---|---|
| 2012/0163354 | A1* | 6/2012 | Stacey | H04W 28/065 |
| | | | | 370/338 |
| 2015/0016360 | A1 | 1/2015 | Merlin et al. | |
| 2016/0365952 | A1 | 12/2016 | Kim et al. | |
| 2017/0126363 | A1* | 5/2017 | Wang | H04W 74/04 |
| 2018/0076992 | A1 | 3/2018 | Nabetani et al. | |

FOREIGN PATENT DOCUMENTS

| | | |
|---|---|---|
| CN | 106301710 A | 1/2017 |
| EP | 2109271 A1 | 10/2009 |
| WO | 2017008828 A1 | 1/2017 |

OTHER PUBLICATIONS

Office Action issued in Chinese Application No. 201880098989.0 dated Oct. 22, 2021, 11 pages.
Liu et al., "VHT Frame Padding," doc.:IEEE 802.11-10/0064r0, Jan. 19, 2010, 9 pages.
PCT International Search Report and Written Opinion issued in International Application No. PCT/EP2018/081333 dated Sep. 6, 2019, 26 pages.
MCC Support, "Final Report of 3GPP TSG RAN WG1 #AH_NR2 v1.0.0," 3GPP TSG RAN WG1 Meeting #90, R1-1712032, Prague, Czech Republic, Aug. 21-25, 2017, 109 pages.
Office Action issued in Chinese Application No. 201880098989.0 dated Jul. 20, 2022, 6 pages (with English translation).
Yang et al., "Patent Survey about New Grade Communication Technology," Science and Technology Management Research, vol. 2013, No. 20, Oct. 2013, 17 pages (with English abstract).

* cited by examiner

DEVICES AND METHODS FOR SUPPORTING HARQ FOR Wi-Fi

CROSS-REFERENCE TO RELATED APPLICATIONS

This application is a continuation of International Application No. PCT/EP2018/081333, filed on Nov. 15, 2018, the disclosure of which is hereby incorporated by reference in its entirety.

TECHNICAL FIELD

The present invention relates to Hybrid Automatic Repeat Request, HARQ, in wireless communication technologies, particularly HARQ for IEEE 802.11, i.e. HARQ for Wi-Fi. To this end, the invention proposes a transmitting device and a receiving device, respectively, both configured to support such HARQ in Wi-Fi, and further proposes corresponding HARQ methods that are compatible with IEEE 802.11.

BACKGROUND

Current versions of the 802.11 standard use a MAC Protocol Data Unit (MPDU) based automatic retransmission, called Automatic Repeat Request (ARQ), wherein incorrectly decoded packets, i.e. MPDUs, are discarded at the receiver, and are then retransmitted (by the transmitter) according to an Acknowledge (ACK)/Block-ACK (BA) protocol.

HARQ is a feature widely used in various wireless technologies such as UMTS and LTE, and allows achieving significantly higher throughput and better PER performance at lower SNR than without HARQ. HARQ can be in particular effective in the unlicensed spectrum or in cases of faulty link adaptation.

Unlike ARQ, with HARQ so-called soft combining (or combining of equalized tones) is enabled. This means that soft bits (LLRs) respective to incorrectly decoded packets are stored in the receiver memory, and are combined with one or more retransmissions of the same information bits of the packet, thus increasing the probability for correct packet detection (after retransmission). Due to the improved performance (after HARQ combining), practical wireless systems employing HARQ can also use a lower fade margin in the rate selection algorithm, which means that the rate selection mechanism can effectively use a higher Modulation and Coding Scheme (MCS).

For the above reasons, there is a desire to introduce HARQ also into the Next Generation Wi-Fi standard. To make this feasible, the introduction of HARQ should be achieved with minimal changes, should rely on existing procedures, and should reuse existing modules such as Forward Error Correction (FEC), MPDU aggregation and Block ACK (BA) procedures, etc.

HARQ in other wireless protocols (e.g. LTE) operates on a transport block boundary, wherein a single bit error in the transport block requires its entire retransmission. Considering that the retransmission is performed on exactly the same data (i.e. the transport block), the combining of stored and retransmitted LLRs is relatively simple.

In contrast, the 802.11 protocol supports partial retransmission based on sub-frame boundaries. In particular, MPDUs can be aggregated into an aggregated MPDU (A-MPDU), but only failed MPDUs (i.e. sub-frames of the A-MPDU frame) are retransmitted, thus significantly reducing retransmission time and amount of memory required for storage. However, this currently defined payload structure and aggregation/encapsulation protocol of 802.11 does not allow the straightforward adoption of the HARQ mechanism into Wi-Fi for the following reasons:

- The scrambling function, which is the first in the PHY transmit chain, operates on the entire payload, i.e. on the whole A-MPDU, regardless of the boundaries between the MPDUs. It operates with a periodicity of 128 bits, while the aggregated MPDUs are 32-bit aligned.
- The scrambling seed is attached in front of the entire payload, and is then FEC encoded together with the first MPDU. Failed intermediate MPDUs retransmitted as the first one will be preceded by a scrambling seed, and hence the order and sign of LLRs changes when retransmitted.
- The LDPC encoder (part of the 802.11 PHY path) operates on blocks of information bits (codewords) regardless of the MPDU boundaries. A failed MPDU located in a different location within a retransmitted A-MPDU is thus not aligned with the beginning of the LDPC codeword, and hence different coded bits are produced (and LLRs at the receiver) that cannot be combined with the LLRs of the failed MPDUs.
- A BA transmitted by the receiver indicates frames (i.e. MPDUs within the A-MPDU) that were decoded correctly, so retransmission occurs only for incorrectly decoded MPDUs.

SUMMARY

In view of the above-mentioned problems and disadvantages, embodiments of the present invention aim to improve the current implementations. An objective is to make wireless communication technologies, particularly IEEE 802.11, i.e. Wi-Fi, compatible with HARQ. In particular, a goal thereby is to integrate the HARQ seamlessly into the Wi-Fi protocol, without modifications of e.g. the MPDU/A-MPDU format, nor of the existing acknowledgement and retransmission procedures. The Wi-Fi protocol with the implemented HARQ should further improve the throughput and PER performance, but at significantly lower SNR than without HARQ.

The objective is achieved by the embodiments of the invention as described in the enclosed independent claims. Advantageous implementations of the present invention are further defined in the dependent claims.

In particular, embodiments of the invention propose an integration of HARQ into 802.11 by decoupling a data unit size (e.g. MPDU size) from a codeword size boundary (e.g. of the LDPC encoder). Further, the data units may also be decoupled from a scrambler periodicity.

A first aspect of the invention provides a transmitting device for supporting HARQ, the transmitting device being configured to: encapsulate a data unit in a container unit, encode the container unit into a codeword set of one or more codewords, wherein a bit-size of the container unit is equal to the bit-size of the codeword set.

A data unit may be an MPDU. By encapsulating it in the container unit, wherein the size of the container unit is selected according to the size of one or more codewords, the data unit sized is decoupled from the codeword size. If a retransmission of a data unit becomes necessary, it will again be encapsulated in the container unit, which is aligned with the beginning of a codeword. Thus, both transmissions of the container unit produce the same coded bits and can be combined at the receiving device. Accordingly, HARQ can be introduced without significant changes to the existing protocol of 802.11.

The device of the first aspect may be configured to scramble the data unit before encapsulating it into the container unit. Alternatively, it can scramble the codeword set as described below.

In an implementation form of the first aspect, the transmitting device is configured to scramble the codeword set based on a scrambling seed, and transmit the scrambled codeword set to a receiving device.

The codeword set can be scrambled and descrambled at the receiving device. Thus, the advantages of scrambling can be obtained without any problems caused by the scrambling, even in case of a retransmission of the data unit, since both transmissions of the container unit produce the same coded bits.

In an implementation form of the first aspect, the transmitting device is configured to: provide an indication of the scrambling seed that is separate from the scrambled codeword set, and transmit the indication of the scrambling seed and then the scrambled codeword set to the receiving device.

Thus, the scrambling seed is not included in the payload, thus addressing the above-mentioned disadvantages. In case of a retransmitted data unit, no preceding scrambling seed changes the LLRs order.

In an implementation form of the first aspect, the transmitting device is configured to: encode and/or modulate the indication of the scrambling seed separately from the container unit.

Thus, the indication of the scrambling seed can be encoded and/or modulated more robustly than the container unit. This reduces the likelihood that the scrambling seed is incorrectly received.

In an implementation form of the first aspect, the transmitting device is configured to: align the bit-size of the container unit and the bit-size of the codeword set.

In an implementation form of the first aspect, the transmitting device is configured to: encapsulate the data unit in the container unit together with a plurality of additional bits to obtain a desired bit-size of the container unit.

In an implementation form of the first aspect, the transmitting device is configured to: encapsulate the data unit in the container unit together with one or more padding bits and/or one or more Zero Length Delimiters, ZLDs, to obtain a bit-size of the container unit that is a multiple of a number of information bits per codeword.

In this way, the transmitting device can align the bit-sizes of container unit and codeword set.

In an implementation form of the first aspect, the transmitting device is configured to: select the number of information bits per codeword based on a coding rate.

In an implementation form of the first aspect, the transmitting device is configured to: determine a number of information bits per codeword by combining a coding-rate-dependent number of information bits with a plurality of additional bits.

In an implementation form of the first aspect, the transmitting device is configured to: use the additional bits (or part thereof) as a Cyclic Redundancy Check, CRC, a codeword sequence and/or other information bits.

In an implementation form of the first aspect, the transmitting device is configured to: aggregate a plurality of codeword sets into an aggregated unit, scramble the aggregated unit based on the scrambling seed, and transmit the scrambled aggregated unit to the receiving device.

Thus, the currently used MPDU/A-MPDU protocol of 802.11 is maintained.

In an implementation form of the first aspect, the transmitting device is configured to: provide a codeword bit-size or a bit-size of the codeword set to the receiving device.

Thus, the receiving device can reliably decode the data unit.

A second aspect of the invention provides a receiving device for supporting HARQ, the receiving device being configured to: receive from a transmitting device at least one scrambled codeword set of one or more codewords, decode the codewords of the codeword set to obtain a container unit, wherein a bit-size of the container unit is equal to the bit-size of the code word set, and decapsulate the container unit to obtain a data unit.

By performing substantially the inverse operation compared to the device of the first aspect, the receiving device supports the introduction of HARQ into Wi-Fi without significant changes to the currently used protocol.

In an implementation form of the second aspect, the receiving device is configured to: descramble the codeword set based on a scrambling seed, before decoding the codewords to obtain the container unit.

In this case, the codeword set may be a scrambled codeword set, i.e. scrambled by the transmitting device. It may alternatively be possible that the transmitting device scrambled the data unit before encapsulating it into the container unit. In this case, the receiving device may be configured to descramble the data unit after decapsulating the container unit.

In an implementation form of the second aspect, the receiving device is configured to: receive from the transmitting device an indication of a scrambling seed and then the scrambled codeword set that is separate from the indication of the scrambling seed, and descramble the scrambled codeword set based on the scrambling seed determined from the indication of the scrambling seed.

In an implementation form of the second aspect, the receiving device is configured to: receive from the transmitting device a scrambled aggregated unit including a plurality of codeword sets, descramble the aggregated unit based on the scrambling seed to obtain the plurality of codeword sets, and decode the codewords of the plurality of codeword sets to obtain a container unit per codeword set.

In an implementation form of the second aspect, the receiving device is configured to: send to the transmitting device an Acknowledge, ACK, or Block ACK, BA, message, depending on whether one or more data units were correctly decoded, receive from the transmitting device, if decoding of at least one codeword failed, a retransmission of the codeword set including the failed codeword, decode the codeword in the retransmission of the codeword set that corresponds to the failed codeword based on a sum of soft-bits of said codeword and soft-bits of the failed codeword.

In an implementation form of the second aspect, the receiving device is configured to: descramble the received codeword set based on a scrambling seed before decoding the codewords to obtain the container unit.

In this case, the received codeword set is a codeword set scrambled by the transmitting device.

In an implementation form of the second aspect, the receiving device is configured to: buffer the soft-bits of a failed codeword.

In an implementation form of the second aspect, the receiving device is configured to: store decoded bits of a successfully decoded codeword included in the same codeword set as a failed codeword, and obtain the container unit corresponding to said codeword set based on the decoded codeword that corresponds to the failed codeword and the stored decoded bits.

A third aspect of the invention provides a method for supporting HARQ, the method comprising: encapsulating a data unit in a container unit, encoding the container unit into a codeword set of one or more codewords, wherein a bit-size of the container unit is equal to the bit-size of the codeword set.

In an implementation form of the third aspect, the method comprises: scrambling the codeword set based on a scrambling seed, and transmitting the scrambled codeword set.

In an implementation form of the third aspect, the method comprises: providing an indication of the scrambling seed that is separate from the scrambled codeword set, and transmitting the indication of the scrambling seed and then the scrambled codeword set to the receiving device.

In an implementation form of the third aspect, the method comprises: encoding and/or modulating the indication of the scrambling seed separately from the container unit.

In an implementation form of the third aspect, the method comprises: aligning the bit-size of the container unit and the bit-size of codeword set.

In an implementation form of the third aspect, the method comprises: encapsulating the data unit in the container unit together with a plurality of additional bits to obtain a desired bit-size of the container unit.

In an implementation form of the third aspect, the method comprises: encapsulating the data unit in the container unit together with one or more padding bits and/or one or more Zero Length Delimiters, ZLDs, to obtain a bit-size of the container unit that is a multiple of the number of information bits per codeword.

In an implementation form of the third aspect, the method comprises: selecting the number of information bits per codeword based on a coding rate.

In an implementation form of the third aspect, the method comprises: determining a number of information bits per codeword by combining a coding-rate-dependent number of information bits with a plurality of additional bits.

In an implementation form of the third aspect, the method comprises: using the additional bits (or subset of) as a Cyclic Redundancy Check, CRC, a codeword sequence and/or other information bits.

In an implementation form of the third aspect, the method comprises: aggregating a plurality of codeword sets into an aggregated unit, scrambling the aggregated unit based on the scrambling seed, and transmitting the scrambled aggregated unit to the receiving device.

In an implementation form of the third aspect, the method comprises: providing a number of information bits per codeword.

The method of the third aspect and its implementation forms provide the same advantages and effects as described above for the transmitting device of the first aspect and its respective implementation forms.

A fourth aspect of the invention provides a method for supporting HARQ, the method comprising: receiving at least one codeword set of one or more codewords, decoding the codewords of the codeword set to obtain a container unit, wherein a bit-size of the container unit is equal to the bit-size of the code word set, and decapsulating the container unit to obtain a data unit.

In an implementation form of the fourth aspect, the codeword set is a scrambled codeword set and the method comprises descrambling the codeword set based on a scrambling seed.

In an implementation form of the fourth aspect, the method comprises: receiving from the transmitting device an indication of a scrambling seed and then the scrambled codeword set that is separate from the indication of the scrambling seed, and descrambling the scrambled codeword set based on the scrambling seed determined from the indication of the scrambling seed.

In an implementation form of the fourth aspect, the method comprises: receiving from the transmitting device a scrambled aggregated unit including a plurality of codeword sets, descrambling the aggregated unit based on the scrambling seed to obtain the plurality of codeword sets, and decoding the codewords of the plurality of codeword sets to obtain a container unit per codeword set.

In an implementation form of the fourth aspect, the method comprises: sending to the transmitting device an Acknowledge, ACK, or Block ACK, BA, message, depending on whether one or more data units were correctly decoded, receiving from the transmitting device, if decoding of at least one codeword failed, a scrambled retransmission of the codeword set including the failed codeword, descrambling the scrambled retransmission of the codeword set based on a scrambling seed, decoding the codeword in the retransmission of the codeword set that corresponds to the failed codeword based on a sum of soft-bits of said codeword and soft-bits of the failed codeword.

In an implementation form of the fourth aspect, the method comprises: buffering the soft-bits of a failed codeword.

In an implementation form of the fourth aspect, the method comprises: storing decoded bits of a successfully decoded codeword included in the same codeword set as a failed codeword, and obtaining the container unit corresponding to said codeword set based on the decoded codeword that corresponds to the failed codeword and the stored decoded bits.

The method of the fourth aspect and its implementation forms provide the same advantages and effects as described above for the receiving device of the second aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which.

DETAILED DESCRIPTION OF EMBODIMENTS

Figure 1:
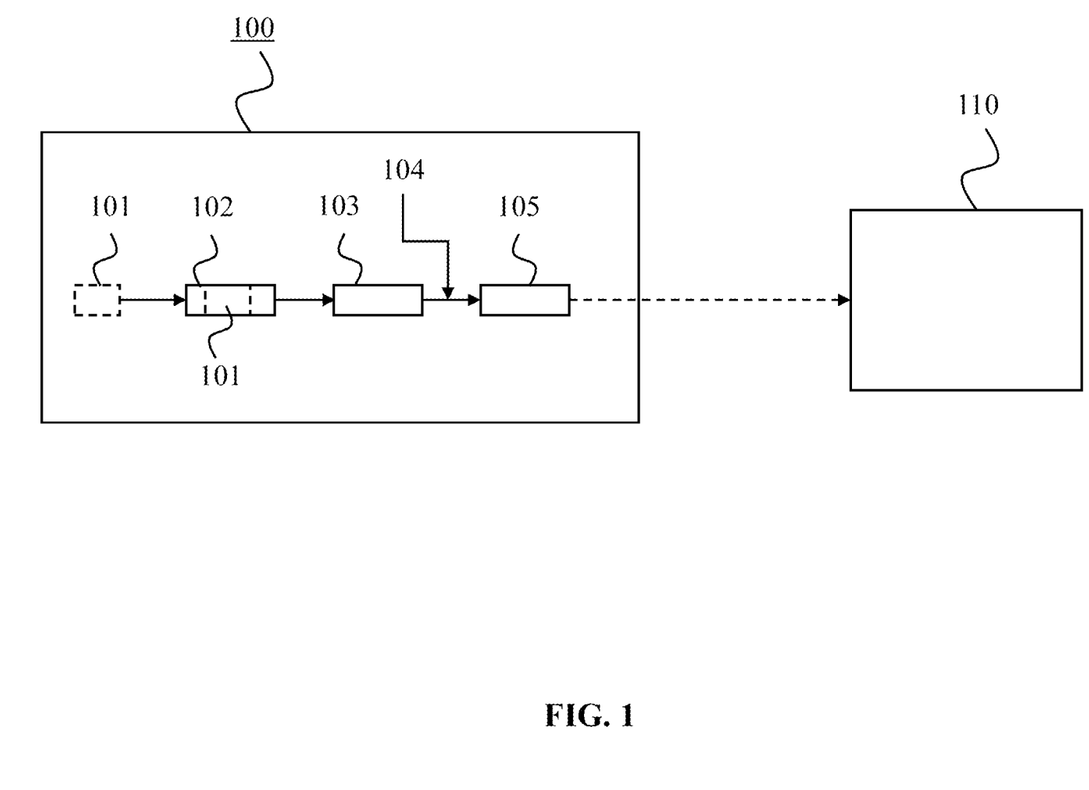
FIG. 1 shows a transmitting device according to an embodiment of the invention.

FIG. 1 shows a transmitting device 100 according to an embodiment of the invention. The transmitting device 100 is configured to support HARQ, particularly HARQ for IEEE 802.11/Wi-Fi. That means, the device 100 may be an 801.11-standard transmitting device supporting HARQ. The transmitting device 100 may be a transmitter or may be included in a transmitter.

The transmitting device 100 is configured to encapsulate a data unit 101 in a container unit 102. The data unit 101 may be an MPDU. Further, the transmitting device 100 is configured to encode the container unit 102 into a codeword set 103 of one or more codewords 303 (see FIG. 3). A codeword 303 may be a LDPC codeword. A bit-size of the container unit 102 is equal to the bit-size of the codeword set 103, i.e. it is equal to or a multiple of a codeword bit-size. The transmitting device 100 is accordingly configured to align the bit-sizes of container unit 102 and one or more codewords 303.

The transmitting device 100 may optionally be further configured to scramble the codeword set 103 based on a scrambling seed 104 (as exemplarily shown in FIG. 1). The scrambling may be carried out by a scrambler, which may be located in the transmitting device 100 after a FEC encoder that carries out FEC encoding. The scrambling seed 104 may include a sequence of bits used as input to the scrambler for scrambling the bits of the codeword set 103. Further, the transmitting device 100 may optionally be further configured to transmit the codeword set 103 or the scrambled codeword set 105 to a receiving device 110. The transmitting device 100 may also be configured to provide the used scrambling seed 104 to the receiving device 110, e.g. in the form of an indication allowing the receiving device 110 to extract or derived the scrambling seed 104.

Figure 2:
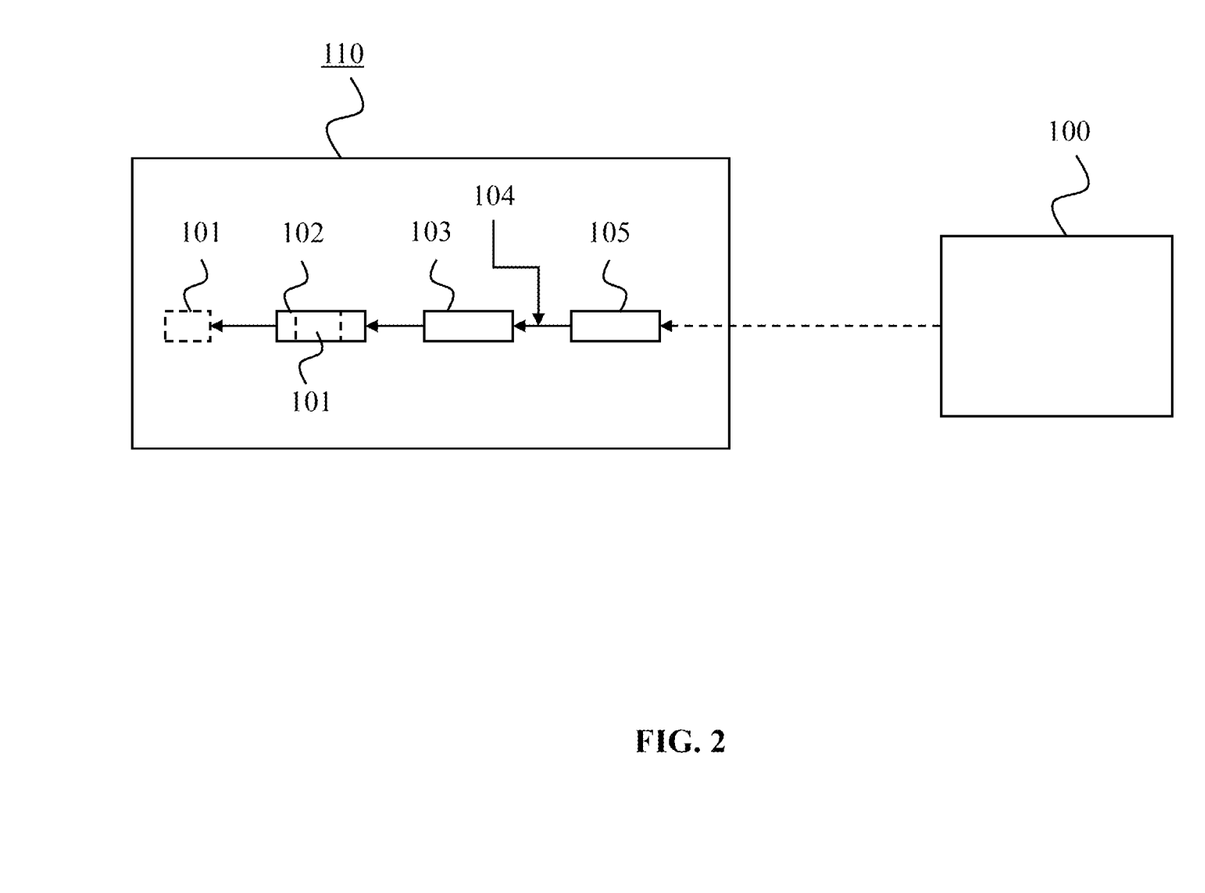
FIG. 2 shows a receiving device according to an embodiment of the invention.

FIG. 2 shows a receiving device 110 according to an embodiment of the invention. The receiving device 110 is configured to support HARQ, particularly HARQ for IEEE 802.11/Wi-Fi, i.e. the device 300 may be an 801.11-standard receiving device supporting HARQ. The receiving device 110 of FIG. 2 is particularly the receiving device 110 of FIG. 1. The transmitting device 100 shown in FIG. 2 may be the one shown in FIG. 1. The receiving device 110 may be a receiver or may be included in a receiver.

The receiving device 110 may be configured to operate inversely to the transmitting device 100 of FIG. 1. In particular, the receiving device 110 is configured to receive from the transmitting device 100 at least one codeword set 103 of one or more codewords 303. The at least one codeword set 103 may be a scrambled codeword set 105. In this case (as exemplarily shown in FIG. 2), the receiving device 110 may be configured to descramble the scrambled codeword set 105 based on a scrambling seed 104, in order to obtain the codeword set 103. Based on e.g. an indication of the scrambling seed 104 provided by the transmitting device 100, the receiving device 100 shall be enabled to use the same scrambling seed 104. Notably, the indication of the scrambling seed 104 may be provided/received separately from the scrambled codeword set 105, for instance, in order to encode and/or modulate it separately from the container unit 102 for improved robustness.

The receiving device 110 is further configured to decode the codewords 303 of the codeword set 103 (either received directly or as descrambled) to obtain a container unit 102, wherein the bit-size of the container unit 102 is again equal to the bit-size of the codeword set 103. That is, the container unit 102 has a bit-size that is equal to or a multiple of a codeword bit-size. Finally, the receiving device 110 is configured to decapsulate the container unit 102 to obtain the data unit 101, e.g. an MPDU, included in the container unit 102.

A main change that enables the utilization of HARQ with 802.11 is the above-described decoupling of the size of the data unit 101, e.g. MPDU size, from the codeword 303 boundary, e.g. a LDPC codeword boundary. This is particularly achieved by encapsulating the data unit 101 into the container unit 102, wherein bit-sizes of container unit 102 and codeword set 103 are aligned.

Figure 3:
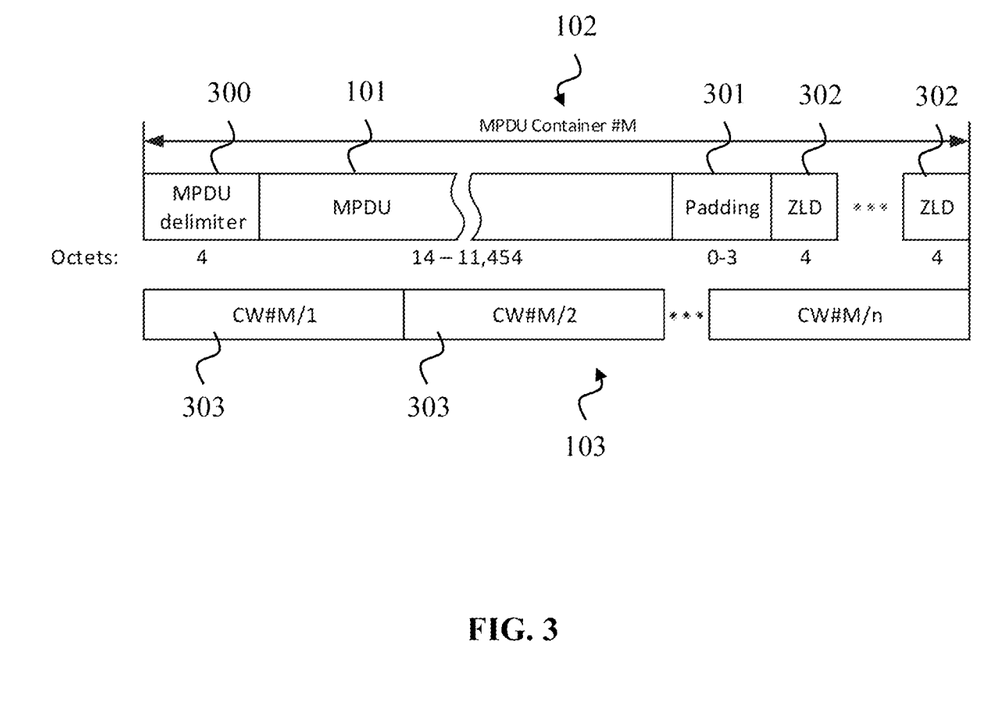
FIG. 3 shows alignment of a container unit to a codeword set.

FIG. 3 shows an example of a container unit 102, as it may be created by the transmitting device 100 of FIG. 1 and decoded by the receiving device 110 of FIG. 2. In this exemplary container unit 102, the data unit 101 is an MPDU. The container unit 102 is bit-size-aligned with a codeword set 103, wherein each codeword 303 is an LPDC codeword. In particular, FIG. 3 shows that boundaries of the container unit 102 and boundaries of the codeword set 103 are aligned.

The MPDU 101 may be encapsulated into the container unit 102 shown in FIG. 3, and thereby aligned to the codeword set 103 boundaries, by first adding a number of padding bytes 301 to the container unit 102. This allows aligning it to 32-bit. Then, some 4-byte Zero Length Delimiters, ZLDs, 302 may be added to the container unit 102, such that the MPDU 101 with a corresponding MPDU delimiter 300 and the padding bytes 301 will include an integer number of the LDPC codewords 303, particularly per selected Coding Rate, CR. That means, the number of information bits per codeword may particularly be selected based on the CR.

Notably, for each MPDU 101 to be transmitted to the receiving device 110, the transmitting device 100 may be configured to generate such a container unit 102. Each container unit 102 is encoded into a codeword set 103, wherein a bit-size of each container unit 102 is aligned with a bit-size of the corresponding codeword set 103. To form an A-MPDU 400 (see FIG. 4), a plurality of the codeword sets 103 (each codeword set 103 corresponding to one MPDU 101) may be aggregated. The A-MPUD 400 may then be scrambled and transmitted to the receiving device 110. That is, the receiving device 110 obtains after descrambling the A-MPDU 400, and can decode the different codeword sets 103 included therein, in order to obtain the corresponding container units 102, i.e. effectively MPDUs 101.

The above-proposed scheme is similar to the pre-FEC padding specified in the current 802.11 standard, but instead of calculating a number of shortening and puncturing bits as a function of the payload size, the number of puncturing and shortening bits in each codeword 303 may be fixed as a function of the CR. Hence, the amount of information bits in the LDPC FEC block may also be fixed, and a Physical Service Data Unit (PSDU) size may be adjusted to a selected combination of puncturing and shortening bits.

For instance, for a codeword 303 including 1944 coded bits, the number of information bits aligned to a 32-bit boundary will be (depending on the CR):

For a CR ½: floor((972−16)/32)*32=928b (116B),
For a CR ⅔: floor((1296−16)/32)*32=1280b (160B),
For a CR ¾: floor((1458−16)/32)*32=1440b (180B),
For a CR ⅚: floor((1620−16)/32)*32=1600b (200B).

This allows adding up to 16 information bits per codeword 303 for passing optional information, for example, one or more of:

Adding per codeword 103 a 16-bit CRC for eliminating probability of false positive result of the LDPC parity check.

Adding a codeword sequence number within an A-MPDU.

Other information.

Figure 4:
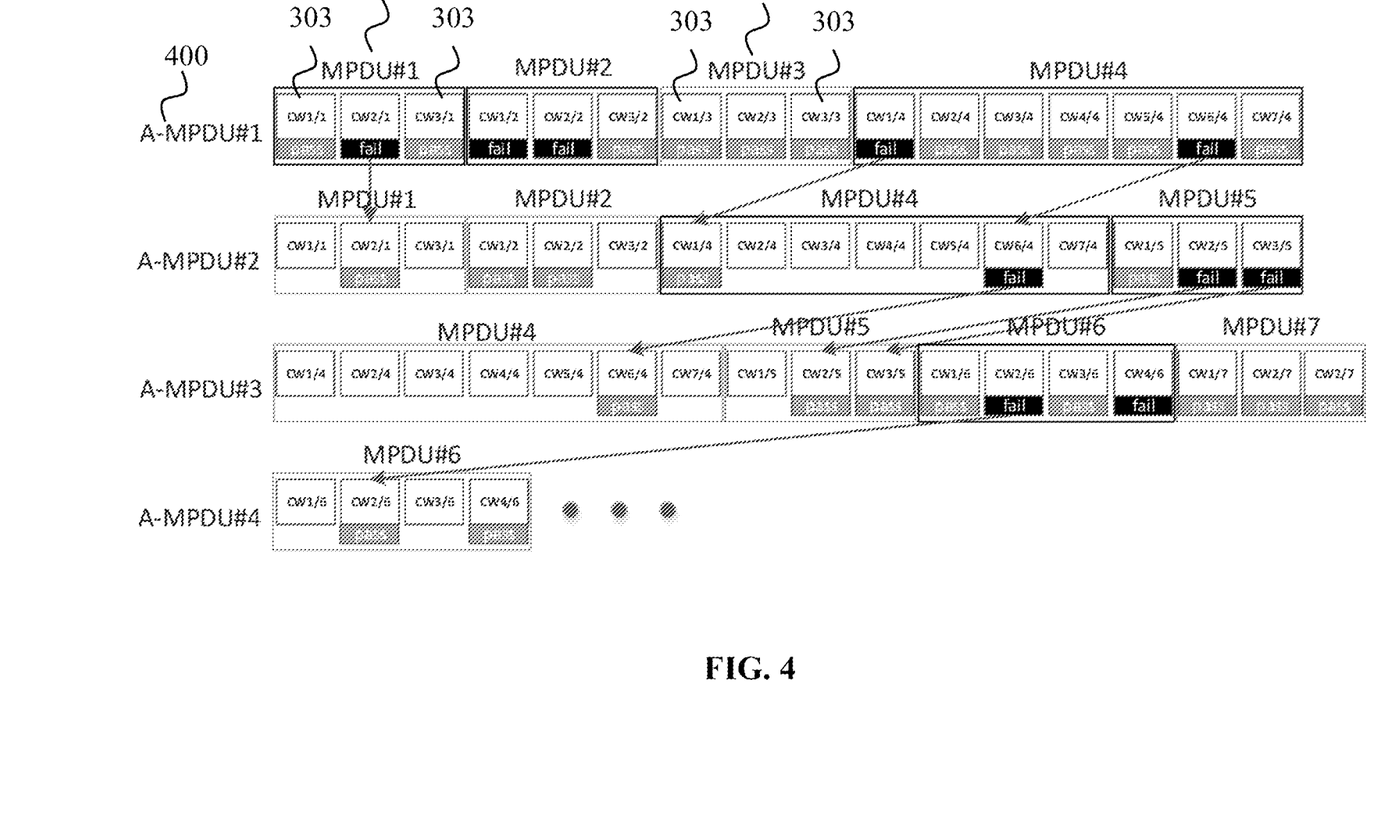
FIG. 4 shows a transmission of an aggregated unit with HARQ.

With the above-proposed scheme, a MPDU 101 of 1536B, for instance transmitted within a A-MPDU 400 at a CR ¾, will be encapsulated into a container unit 102 of size ceil((4+MPDU)/CW)*CW=1620B by adding (1620−1540)/4=20 ZLDs (80 bytes).

Following the above rules, both the transmitting device 100 and the receiving device 110 will be able to map FEC codewords 303 into MPDUs 101.

In the following, a retransmission of a data unit 101 (exemplarily a MPDU) with HARQ is explained. For Physical Protocol Data Units, PPDUs, transmitted with HARQ, the receiver PHY is expected to buffer per user LLRs on a codeword basis. The codeword size used by the transmitting device 100 may be signaled, for instance via one of the signal fields of the PHY header, to the receiving device 110.

Per codeword LLRs after descrambling may be forwarded to the LDPC FEC that decodes them in order of their arrival, and then passes decoded bits towards the MAC. The MAC may de-aggregate the bit stream, remove ZLDs and may validate the MPDUs 101.

In parallel with the de-aggregation and MPDU validation, the MAC may also count the codeword of an incoming PSDU, assuming that all the LDPC codewords 303 were encoded with the exact same number of information bits (function of signaled CR) and number of coded bits in the codeword 303. Then, it may feed back to the PHY the sequence numbers of the first and the last codewords 303 per each container unit 102 together with the status of the MPDU validation. Depending on the status of the MPDU validation, the following scenarios are possible:

1. LLRs of the codewords 303 corresponding to the MPDUs 101 that passed FCS validation by the MAC may be released (flushed) according to the codewords' sequence numbers within PSDU fed back from the MAC.
2. The LLRs corresponding to the MPDU 101 that has valid delimiter but failed FCS validation should be stored if they failed per codeword FEC parity check. For the remaining codewords 303 of failed MPDUs 101, the PHY is expected to store only decoded bits to be used for concatenation with correct ones out of FEC after retransmission.
3. For the codewords 303, for which corresponding decoded bits do not contain a valid delimiter in the predefined location (e.g. first four bytes of a codeword 303), the MAC is expected to continue searching the first four bytes of every codeword 303 for a valid delimiter and return to the PHY of the receiver the SNs of the first and the last codewords 303 of the PSDU that correspond to the entire block of data forwarded to the MAC, where the delimiter has not been found.
4. There is low, but non-zero probability of the false positive parity check of the LDPC codeword 303. In case when all the codeword 303 corresponding to the MPDU 101 that failed FCS validation passed the FEC parity check, the PHY is expected to store LLRs of all the codewords 303 of the MPDU 101 to be used for LLR combining during retransmission.
5. In order to reduce probability of false positive LDPC parity check (or similarly, if part of the BCC-encoded data) was decoded correctly, an option of incorporating a CRC is proposed:
6. For LDPC-encoded data, a CRC may be added to the information bits prior to LDPC encoding
7. For BCC-encoded data, a CRC may be added to every block of pre-defined number of information bits, e.g. every 1000 bits at the input to the BCC encoder.
8. If a valid delimiter has not been found until the very end of the PSDU, all LLRs corresponding to the codewords 303 following the codeword 303 with expected delimiter location shall be flushed from the memory.
9. ZLDs 302 padding the last MPDU 101 of the A-MPDU 400 should have EOF bit of the delimiter set indicating that reception can be terminated and that all the LLRs corresponding to the remaining codewords 303 do not have to be stored.

FIG. 4 shows an example that demonstrates a retransmission procedure with HARQ supported by the transmitting device 100 and the receiving device 110, respectively. The receiving device 110 may receive from the transmitting device 100 a (scrambled) A-MPDU 400 including a plurality of codeword sets 103, and may descramble it to obtain these codeword sets 103. FIG. 4 particularly assumes that the receiving device 110 initially receives (and descrambles) a first A-MPDU 400 (A-MPDU #1), which includes four codeword sets 103 each consisting of multiple codewords 303 (CW1/1 . . . CW3/1 for the first codeword set 103; CW1/2 . . . CW3/2 for the second codeword set 103; and so on). Each codeword set 103 corresponds to one encoded container unit 102 and thus is associated with one of four MPDUs 101 (MPDU #1-MPDU #4).

The MPDU #1 conveyed by the first A-MPDU #1 is in particular associated with the first codeword set 103 including the three codewords CW1/1, CW2/1, CW3/1. For a CR 3/4 the bit-size of this first codeword set 303—which is aligned with a bit-size of the corresponding container unit 102 containing the MPDU #1—is 180*3=540B in size. FIG. 4 shows that decoding of the first codeword CW1/1 and third codeword CW3/1 is successful, while the decoding of the second codeword CW2/1 failed. For CW1/1 and CW3/1, the PHY may accordingly store 180 decoded bytes for each. For CW2/1, the LLRs may be stored.

The receiving device 110 may then receive from the transmitting device 110, a (scrambled) retransmission of the failed codeword 303, particularly of the entire codeword set 103 including the failed codeword 303. FIG. 4 assumes that the previously failed CW2/1 (associated with MPDU #1) included in the A-MPDU #1 is retransmitted in the A-MPDU #2 to the receiving device 110 (which receives and descrambles it). The CW1/1 and CW3/1 303 of the same codeword set 103 retransmitted within the A-MPDU #2 may be ignored. The LLRs of the CW2/1 in the A-MPDU #2 can then, at the receiving device 110, be either fed into the FEC directly or after combining them with corresponding LLRs from the previously failed transmission. In particular, the receiving device 110 may be configured to decode CW2/1 in the retransmission (A-MPDU #2) based on soft-bits of said CW2/1 and soft-bits of the previously failed CW2/1 in the initial transmission (A-MPDU #1).

Notably, it is the responsibility of the transmitting device 100 to ensure that multiple MPDUs containing failed codewords 303 (in FIG. 4 also CW1/4 and CW6/4 failed) are retransmitted in exactly the same order as they were transmitted in the previous transmission (in FIG. 4, the A-MPDU #2 includes the previously failed codewords 303 in the same order than A-MPDU #1). MPDU3 of the A-MPDU #1 that has not contained failed codewords shall not be retransmitted by the transmitting device 100.

Figure 5:
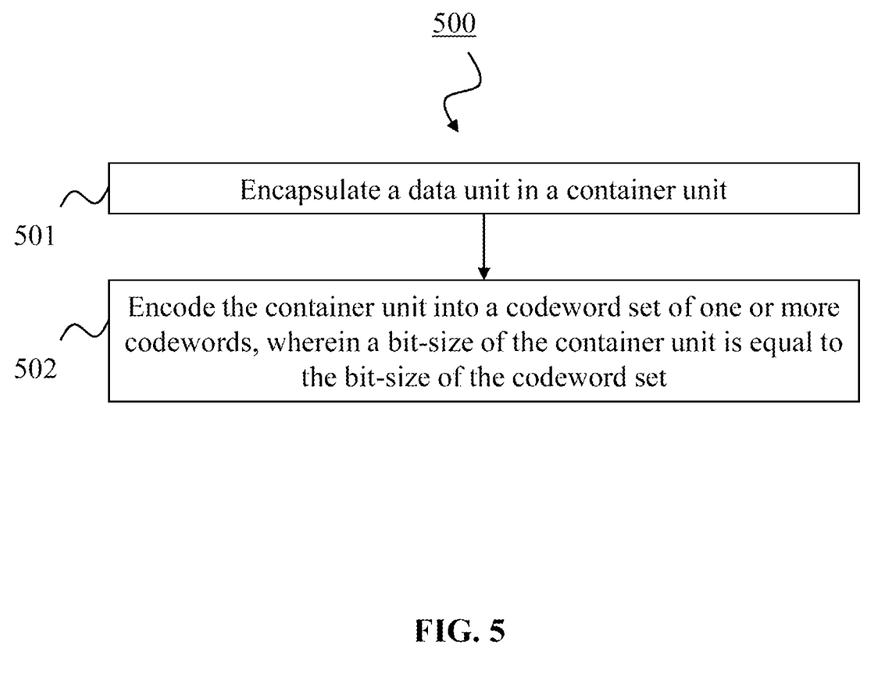
FIG. 5 shows a method according to an embodiment of the invention.

FIG. 5 shows a method 500 according to an embodiment of the invention, particularly for supporting HARQ. The method 500 comprises: a step 501 of encapsulating a data unit 101 in a container unit 102; and a step 502 of encoding the container unit 102 into a codeword set 103 of one or more codewords 303, wherein a bit-size of the container unit 102 is equal to the bit-size of the codeword set 103. Optionally, the method 500 may further comprise a step 503 of scrambling the codeword set 103 based on a scrambling seed 104; and optionally a step 504 of transmitting the scrambled codeword set 105. The method 500 may be performed by a transmitting device 100, and the codeword set 103 or the scrambled codeword set 105 may be transmitted to a receiving device 110.

Figure 6:
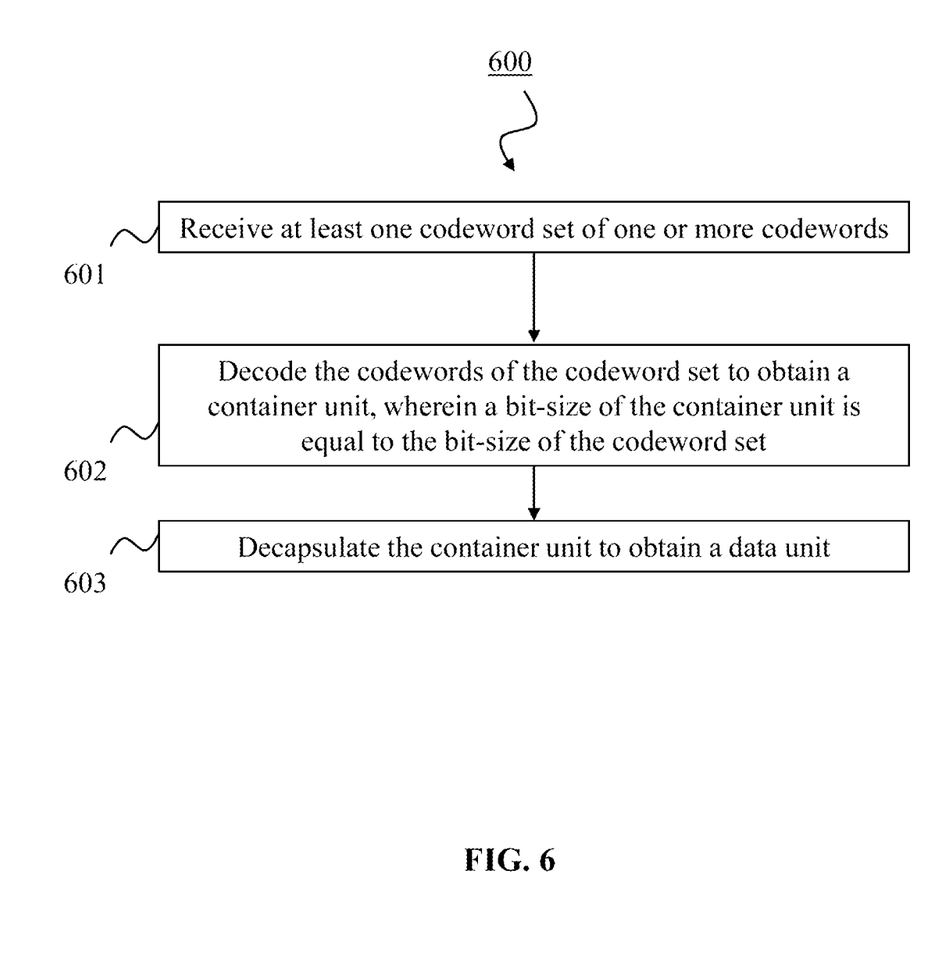
FIG. 6 shows a method according to an embodiment of the invention.

FIG. 6 shows a method 600 according to an embodiment of the invention, particularly for supporting HARQ. The method 600 comprises: a step 601 of receiving at least one codeword set 103 of one or more codewords 303. Optionally, if in fact a scrambled codeword set 105 is received, the method 600 may comprise a step of descrambling the codeword set 103 based on a scrambling seed 104. The method 600 further comprises a step 602 of decoding the codewords 303 of the codeword set 103 to obtain a container unit 102, wherein a bit-size of the container unit 102 is equal to the bit-size of the codeword set 103; and a step 603 of decapsulating the container unit 102 to obtain a data unit 101. The method 600 may be performed by a receiving device 110, and the scrambled codeword set 105 may be received from a transmitting device 100.

Another possible change that further supports the utilization of HARQ with 802.11 concerns the scrambler. The scrambler is used to avoid long sequences of same repeated bits (either many 0s or 1s) in the bit-stream, hence its output may be pseudo-random. This helps taming the Peak to Average Power Ratio, PAPR, as well as ensuring interfering transmissions from other STAs (e.g. devices 100, 110), in the extreme case they are synchronized, may behave more like random noise. The scrambling seed of the scrambler may be randomly chosen, and may typically change between transmissions, so as to restrain the PAPR on average.

Figure 7:
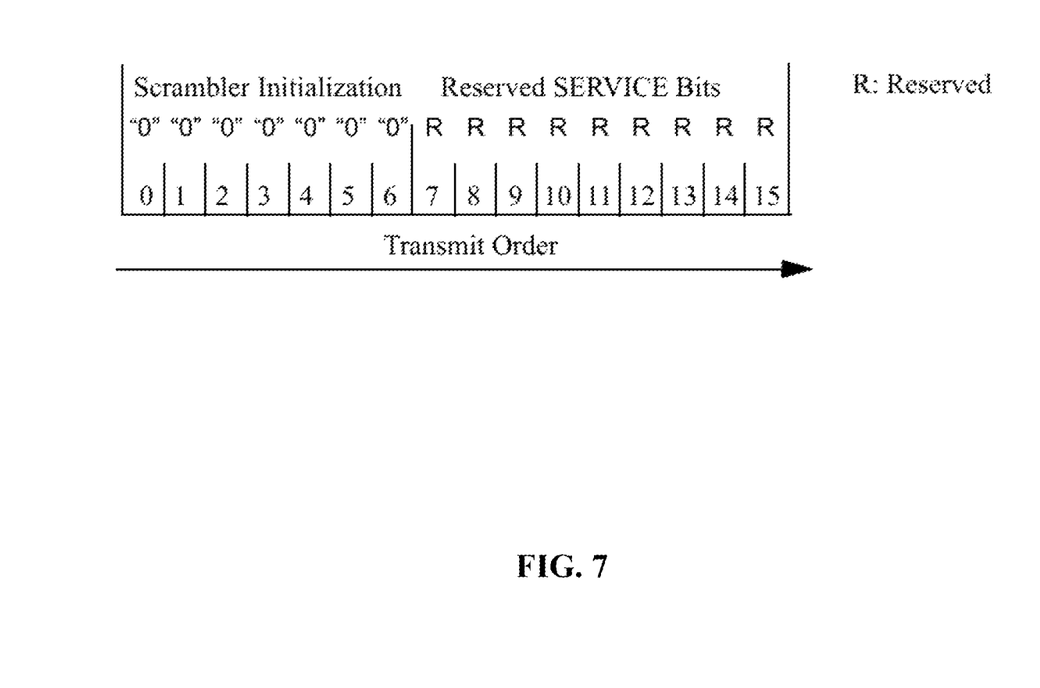
FIG. 7 shows a format of conventional SERVICE field and scrambling seed in 802.11.

In order to provide the scrambling seed to the receiver, the payload portion of every 802.11 frame (PPDU) is conventionally prepended with a 16-bit SERVICE field, which contains 7 bits of scrambler initialization and 9 zero bits. Such a SERVICE field is shown in FIG. 7. The SERVICE field is conventionally encoded together with the data portion. This means, however, that when LDPC is used, (only) the first LDPC codeword contains the SERVICE field. At the receiver side, immediately after the first few bits are decoded, the first 7 bits respective to scrambler initialization are used to configure the descrambler. This conventional configuration of the scrambler (including the SERVICE field) and FEC has the following impact:

Since at the receiver side the descrambler is deployed after the FEC decoder, straightforwardly introducing HARQ would mean that the same scrambling seed must be used for retransmissions, in order to ensure that possibly different redundancy versions of the same codeword is carried by both the original transmission and the following (optional) retransmissions. This would not allow the use of a (semi-)random scrambling seed.

The SERVICE field undergoes the same modulation like the data, implying that an error in decoding the scrambling seed leads to a failure of decoding the entire PPDU, even if there are no errors anywhere within the PPDU actual payload. Thus, a more robust scheme for protecting the scrambler seed would be advantageous.

In order to address the above scrambler related issues, the following is proposed for the supporting the introduction of HARQ into 802.11: A location/order of an FEC encoder and a scrambler in the transmitting device 100 according to an embodiment of the invention, e.g. as shown in FIG. 1, may be switched, so that the scrambler operates on the coded bits. Likewise, also a location/order of a descrambler and FEC decoder in the receiving device 110 according to an embodiment of the invention, e.g. as shown in FIG. 2, may be switched. Further, the SERVICE field (specifically, an indication of the scrambling seed 104) may be separated from the encoding of the data portion (codewords 303 associated with data units 101).

In summary, embodiments of the present invention achieve multiple benefits. Both lab measurements and simulations indicate that HARQ can achieve same throughput and PER performance at significantly lower SINR than without HARQ. HARQ can be especially effective in unlicensed spectrum or cases of faulty link adaptation.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A transmitting device for supporting Hybrid Automatic Repeat Request (HARD), comprising:
at least one processor; and
one or more memories coupled to the at least one processor and storing programming instructions for execution by the at least one processor to:
encapsulate a data unit in a container unit, wherein the container unit comprises the data unit, one or more padding bits, and one or more four-byte Zero Length Delimiters (ZLDs) following the one or more padding bits; and
encode the container unit into a code word set of one or more code words, wherein a bit-size of the container unit is equal to a bit-size of the code word set.

2. The transmitting device according to claim 1, wherein the programming instructions are for execution by the at least one processor to:
scramble the code word set based on a scrambling seed; and transmit the scrambled code word set to a receiving device.

3. The transmitting device according to claim 2, wherein the programming instructions are for execution by the at least one processor to:
provide an indication of the scrambling seed that is separate from the scrambled code word set; and
transmit the indication of the scrambling seed and then the scrambled code word set to the receiving device.

4. The transmitting device according to claim 3, wherein the programming instructions are for execution by the at least one processor to:
at least one of encode or modulate the indication of the scrambling seed separately from the container unit.

5. The transmitting device according to claim 2, wherein the programming instructions are for execution by the at least one processor to:
align the bit-size of the container unit and the bit-size of the code word set.

6. The transmitting device according to claim 5, wherein the programming instructions are for execution by the at least one processor to:
encapsulate the data unit in the container unit together with a plurality of additional bits to obtain a desired bit-size of the container unit.

7. The transmitting device according to claim 5, wherein the programming instructions are for execution by the at least one processor to:
encapsulate the data unit in the container unit together with the one or more padding bits and the one or more ZLDs to obtain a bit-size of the container unit that is a multiple of a number of information bits per code word.

8. The transmitting device according to claim 7, wherein the programming instructions are for execution by the at least one processor to:
select the number of information bits per code word based on a coding rate.

9. The transmitting device according claim 5, wherein the programming instructions are for execution by the at least one processor to:
determine a number of information bits per code word by combining a coding-rate-dependent number of information bits with a plurality of additional bits.

10. The transmitting device according to claim 9, wherein the programming instructions are for execution by the at least one processor to:
use the additional bits as at least one of a Cyclic Redundancy Check (CRC), a code word sequence, or other information bits.

11. The transmitting device according to claim 2, wherein the programming instructions are for execution by the at least one processor to:
aggregate a plurality of code word sets into an aggregated unit;
scramble the aggregated unit based on the scrambling seed; and
transmit the scrambled aggregated unit to the receiving device.

12. The transmitting device according to claim 2, wherein the programming instructions are for execution by the at least one processor to:
provide a code word bit-size or the bit-size of the code word set to the receiving device.

13. A receiving device for supporting Hybrid Automatic Repeat Request (HARD), comprising:
at least one processor; and
one or more memories coupled to the at least one processor and storing programming instructions for execution by the at least one processor to:
receive, from a transmitting device, at least one code word set of one or more code words;
decode the code words of the code word set to obtain a container unit, wherein a bit-size of the container unit is equal to a bit-size of the code word set; and
decapsulate the container unit to obtain a data unit, wherein the container unit comprises the data unit, one or more padding bits, and one or more four-byte Zero Length Delimiters (ZLDs) following the one or more padding bits.

14. The receiving device according to claim 13, wherein the programming instructions are for execution by the at least one processor to:
descramble the received code word set based on a scrambling seed before decoding the code words to obtain the container unit.

15. The receiving device according to claim 14, wherein the programming instructions are for execution by the at least one processor to:
receive, from the transmitting device, an indication of a scrambling seed and then the code word set that is separate from the indication of the scrambling seed; and
descramble the code word set based on the scrambling seed determined from the indication of the scrambling seed.

16. The receiving device according to claim 15, wherein the programming instructions are for execution by the at least one processor to:
receive, from the transmitting device, a scrambled aggregated unit including a plurality of code word sets;
descramble the aggregated unit based on the scrambling seed to obtain the plurality of code word sets; and
decode the code words of the plurality of code word sets to obtain a container unit per code word set.

17. The receiving device according to claim 14, wherein the programming instructions are for execution by the at least one processor to:
send, to the transmitting device, an Acknowledge (ACK) or Block ACK message depending on whether one or more code words were correctly decoded;
receive, from the transmitting device and if decoding of at least one code word failed, a retransmission of the code word set including the failed code word; and
decode the code word in the retransmission of the code word set that corresponds to the failed code word based on a sum of soft-bits of said code word and soft-bits of the failed code word.

18. The receiving device according to claim 17, wherein the programming instructions are for execution by the at least one processor to:
buffer the soft-bits of a failed code word.

19. The receiving device according to claim 17, wherein the programming instructions are for execution by the at least one processor to:
store decoded bits of a successfully decoded code word included in the same code word set as a failed code word; and
obtain the container unit corresponding to said code word set based on the decoded code word corresponding to the failed code word and the stored decoded bits.

20. A method for supporting Hybrid Automatic Repeat Request (HARQ), the method comprising:

encapsulating a data unit in a container unit, wherein the container unit comprises the data unit, one or more padding bits, and one or more four-byte Zero Length Delimiters (ZLDs) following the one or more padding bits; and encoding the container unit into a code word set of one or more code words, wherein a bit-size of the container unit is equal to a bit-size of the code word set.

21. A method for supporting Hybrid Automatic Repeat Request (HARQ), the method comprising:

receiving at least one code word set of one or more code words;

decoding the code words of the code word set to obtain a container unit, wherein a bit-size of the container unit is equal to a bit-size of the code word set; and decapsulating the container unit to obtain a data unit, wherein the container unit comprises the data unit, one or more padding bits, and one or more four-byte Zero Length Delimiters (ZLDs) following the one or more padding bits.

* * * * *